US005731944A

United States Patent [19]

Yasukuni et al.

[11] Patent Number: 5,731,944

[45] Date of Patent: Mar. 24, 1998

[54] CIRCUIT PROTECTING DEVICE FOR AN AUTOMOTIVE WIRING HARNESS

[75] Inventors: Jun Yasukuni; Takeharu Itoh; Yoshihiro Maeda; Keiji Maki, all of Yokkaichi, Japan

[73] Assignee: Sumitomo Wiring Systems, Ltd., Japan

[21] Appl. No.: 653,793

[22] Filed: May 28, 1996

[30] Foreign Application Priority Data

May 29, 1995 [JP] Japan .................................... 7-130721
Jun. 20, 1995 [JP] Japan .................................... 7-153136

[51] Int. Cl.$^6$ .................................................. H02H 5/04

[52] U.S. Cl. ............................. 361/104; 361/63; 361/630

[58] Field of Search .................................. 307/10.1, 10.7, 307/30, 85–86; 361/103, 104, 63, 630

[56] References Cited

U.S. PATENT DOCUMENTS

| | | | |
|---|---|---|---|
| 4,721,862 | 1/1988 | Cooper | 307/10.1 |
| 5,038,050 | 8/1991 | Minoura | 307/10.1 |
| 5,353,190 | 10/1994 | Nakayama et al. | 361/647 |
| 5,357,142 | 10/1994 | Kubota et al. | 307/10.1 |
| 5,501,605 | 3/1996 | Ozaki et al. | 439/34 |

FOREIGN PATENT DOCUMENTS

| | | |
|---|---|---|
| 39 13 712 | 10/1990 | Germany . |
| 52-86148 | 7/1977 | Japan . |
| 54-121466 | 9/1979 | Japan . |
| 61-14625 | 4/1986 | Japan . |

OTHER PUBLICATIONS

Ingenieur de L'Automobile, No. 2, Feb. 1980–Mar. 1980, Paris, FR, pp. 39–50, XP002013851 Guagliumi et al. "Systeme Electrique Multiplex" p. 48, col. 1, line 41–col. 2, line 6; Figure 1.

Ingenieur de L'Automobile, No. 8, Nov. 1984, Paris, FR, pp. 71–78, XP002013852 Salvay et al. "Le Multiplexage Lucas" p. 75, col. 2, line 24–line 27; Figure 4.

*Primary Examiner*—Fritz Fleming
*Assistant Examiner*—Michael Sherry
*Attorney, Agent, or Firm*—Anthony J. Casella; Gerald E. Hespos; Ludomir A. Budzyn

[57] ABSTRACT

A circuit protecting device for an automotive wiring harness designed to make the dimensions of wires downstream from fuses smaller and minimize the number of circuits which will be brought into an inoperative state upon blowout of a fuse resulting from a short circuit which occurs in a wire by supplying protecting circuits for supplying power from a power source to loads with fuses provided in the circuits connected in one-to-one relationship with the loads so that, upon blowout of one fuse, only a power supply to the load connected with this fuse is cut off. The fuses are formed by a flat fuse 20 including a plurality of conductive fusible elements 21 arranged at specified intervals on the surface of an insulating plate 22.

23 Claims, 7 Drawing Sheets

CIRCUIT PROTECTING DEVICE FOR AN AUTOMOTIVE WIRING HARNESS

BACKGROUND OF THE INVENTION

1. Field of the Invention

The present invention relates to a circuit protecting device for an automotive wiring harness.

2. Description of the Prior Art

In a prior art circuit protecting device for an automotive wiring harness, a fuse is provided between a power source and loads so that, upon a flow of an overcurrent, it blows out to protect circuits. Fuses used in the prior art devices includes blade fuses and minifuses. These fuses are connected with only a single circuit or a plurality of circuits connected in parallel. Further, the dimensions of these fuses are relatively large: 20×18×5 mm (blade fuses) and 16×11×4 mm (minifuses). Accordingly, in particular if the space taken by a terminal to be connected with the fuse is taken into account, a considerably large space is required for the arrangement of one fuse. In view of this, one circuit connected with the fuse is divided into a plurality of branch circuits, which are to be connected with the respective loads. In other words, a plurality of loads are connected in parallel with one fuse to protect circuits.

Specifically, the prior art device is constructed as shown in FIG. 8. A wire W1 connected with a power source BA is connected with a circuit 3A formed by busbars or the like accommodated in a junction box 2. A fuse 4 mounted in a fuse receptacle is connected with the circuit 3A. A circuit 3B connected with a downstream end of the fuse 4 is divided into a plurality of branch circuits or subcircuits 5A to 5C which are connected with loads 6A to 6C via wires W2 to W4. The above connection enables power to be supplied to the respective loads 6A to 6C.

In the case that a plurality of loads 6A to 6C are connected with one fuse 4 as described above, if the current carrying capacities of electric devices as the loads 6A to 6C are 3 ampere (A), 5 A, and 2 A, respectively, the total current carrying capacity of the loads 6A to 6C is 10 A. The current carrying capacity of the fuse 4 connected with the loads 6A to 6C needs to be 10/0.7=14.3 A because a current carrying capacity ratio of the fuse to the loads is set to be about 70% in a vehicle compartment. Thus, a fuse having a current carrying capacity of at least about 15 A needs to be used as the fuse 4, e.g. in the case of an application in the field of automotive vehicles.

The relationship between the fuse 4 and the dimensions of the wires W2 to W4 to be connected with the downstream end of the fuse 4 is determined as follows. When the wire downstream from the fuse experiences a short circuit or like problem, the fuse needs to blow out before the wire experiences smoking or the circuit is damaged in order to protect the wire and circuits. Accordingly, there is used a wire having a large current carrying capacity compared with an actually flowing current, i.e. a wire having a large core cross section of 0.5 mm$^2$ and a heavy weight. The relationship between the current carrying capacity of the fuse and the dimensions of the wire connected with the downstream end of the fuse is as defined in TABLE-1.

TABLE 1

| | | Vehicle Compartment | | | | | Engine Compartment | | | | |
|---|---|---|---|---|---|---|---|---|---|---|---|
| Wire Dimensions (Core Cross Section (mm$^2$)) | | 0.3 | 0.5 | 0.85 | 1.25 | 2 | 0.3 | 0.5 | 0.85 | 1.25 | 2 |
| Current Carrying Capacity (A) of Wire | | 7A | 11A | 15A | 19A | 25A | 4A | 6A | 8A | 10A | 19A |
| Current | 7.5A | o | o | o | o | o | o | o | o | o | o |
| Carrying | 10A | o | o | o | o | o | o | o | o | o | o |
| Capacity | 15A | x | o | o | o | o | x | x | o | o | o |
| of Fuse | 20A | x | x | o | o | o | x | x | x | o | o |
| (A) | 25A | x | x | x | o | o | x | x | x | x | o |
| | 30A | x | x | x | x | o | x | x | x | x | o |

(o: wire can be used, x: wire cannot be used)

As can be seen from TABLE-1, if a plurality of loads are connected e.g. in parallel with one fuse, the dimensions of the wires for connecting the fuse and the respective loads need to be large, leading to a considerable increase in the weight of the wiring harness. This in turn requires accessories for the wiring harness such as clips for engaging the wiring harness with a vehicle body and a protector to be enlarged and strengthened, and leads to an increased cost and size for the wires. Thus, the above connection results in an increased production cost of the wiring harness.

Particularly, in automotive vehicles, about 70% of all wires (circuits) are connected with the loads having a current carrying capacity of 1 A or lower to transmit signals. The wires suitable for the above connection are too thick for the wires for signal circuits.

Further, in FIG. 8, if the fuse 4 blows out upon occurrence of a short circuit in point A of the wire W2 connecting the load 6A and the fuse 4, power is not supplied to the wires W3, W4 having experienced no short circuit. Thus, the loads 6B and 6C disadvantageously stop operating.

Furthermore, when a plurality of loads 6A–6C are connected in parallel with one single fuse 4, as can be seen in FIG. 8, the current carrying capacity of the fuse 4 has to be set higher than the sum of all currents actually flowing in the loads 6A–6C. Therefore the actual current at which the fuse 4 will blow in case of a short circuit is raised, thus enlarging the danger for each load 6A–6C (e.g. an electronic circuit) of being damaged. Furthermore when the fuse 4 is blown it is difficult to discriminate which of the loads 6A–6C has caused an increased current to flow.

In view of the above problems, an object of the invention is to provide an improved circuit protecting device allowing for a better protection of the connected loads and having a reduced size.

SUMMARY OF THE INVENTION

According to the invention there is provided, a circuit protecting device for an automotive wiring harness, comprising at least one primary side connecting portion, at least two secondary side connecting portions and at least two fusible elements.

According to a preferred embodiment of the invention, each secondary side connecting portion is connected with the at least one primary connecting portion via at least one fusible element.

Preferably, there is provided an equal number of secondary side connecting portions and primary connecting portions and wherein each secondary side connecting portion is connected with a corresponding primary side connecting portion via a fusible element.

Further preferably, the at least one primary side connecting portion, the at least two secondary side connecting portions and the at least two fusible elements are arranged in and/or on a body, wherein the body is preferably formed by one or more covers and/or casted as a single molded body.

According to a further embodiment, the each fusible element comprises at least one wire having a predetermined or predeterminable current carrying capacity, preferably wherein the wires each have an individually predetermined or predeterminable current carrying capacity, wherein further preferably the wires have a core cross section in the range of about 0.05 $mm^2$ to about 0.3 $mm^2$.

According to a further preferred embodiment, the fusible elements are arranged at specified intervals on the surface of an insulating plate.

Preferably, the at least one primary side connecting portion, the at least two secondary side connecting portions and the at least two fusible elements are arrangeable in a single socket means.

Further preferably, at least fusible parts of the fusible elements are visible from the outside, such that a burned fusible element is easily recognizable.

Still further preferably, the fusible elements are connectable to loads having a small current carrying capacity, in particular of 2 A or smaller in a one-to-one relationship.

According to a further preferred embodiment, a multitude of fusible elements, which are connectable with neighboring loads are accommodated as a single unit in a fuse receptacle, in particular being located in an electrical connection box or in a fuse box which are dispersedly disposable in an automotive vehicle, in particular so as to shorten the length of wires connecting the corresponding fuses and loads.

Preferably, thin wires having a core cross section of about 0.05 $mm^2$ to about 0.3 $mm^2$ are usable as connecting wires for connecting the fusible elements and the loads, while wires having a core cross section of about 0.5 $mm^2$ or larger are usable as power source side wires and are disposed on the power source side of the fusible elements, wherein further preferably the usable power source side wires each have one end connected with a power source and the other end branched to be connected with one or more fusible elements.

According to a preferred embodiment, there is provided a circuit protecting device for an automotive wiring harness, comprising a fuse mounted in each circuit for supplying power from a power source to a corresponding load, wherein one fuse is connected only with one load so that, upon blowout of the fuse, only a power supply to the load connected with the blown fuse is cut off.

In other words, a single fuse is provided in a circuit for connecting a power source and a load so that the fuse blows out upon a short circuit of a wire to prevent a wire from getting burnt. Especially, only a power supply to a circuit having experienced a short circuit is cut, thereby eliminating an influence on other circuits and shortening a total length of the wires used to connect the fuses and the loads.

In other words, a fuse is provided in a circuit for connecting a power source and a load so that the fuse blows upon a short circuit of a wire to prevent a wire from getting burned. Especially, only a power supply to a circuit having experienced a short circuit is cut, thereby eliminating an influence on other circuits.

Thus there is provided a way to provide a lighter wiring harness by making the dimensions of wires to be connected with loads at downstream sides of fuses and to ensure a secure power supply to loads connected with wires having experienced no short circuit.

In the above circuit protecting device, the fuses and the loads are connected in one-to-one relationship and, accordingly, the current carrying capacity of each fuse can be made smaller. Thus, the dimensions of the wires for connecting the fuses and the loads can be made smaller, which contributes to lightening the wiring harness. Further, since the circuits are individually protected, upon blowout of a fuse, only a power supply to a load connected with this fuse is cut off. Thus, the loads connected with the wires having experienced no short circuit are not influenced.

As is clear from the above, since the loads and fuses are mounted in one-to-one relationship, the current carrying capacity of each fuse can be made smaller. As a result, thin wires having a core diameter of 0.3 $mm^2$ to 0.05 $mm^2$ can be used as wires for connecting the fuses and the loads. Particularly, in the case that the load is a signal device having a current carrying capacity of 1 A or smaller, the fuse is allowed to have a capacity of 2 A or smaller and the wire for connecting the fuse and the signal device is allowed to have a very small core cross section of 0.14 $mm^2$. Since about 70% of all circuits are signal circuits, the total weight of the wires constituting the wiring harness can be remarkably reduced. At the same time, the wiring harness can be manufactured at a reduced size because of the use of thin wires.

Further, a circuit protection can be individually realized for the loads. Accordingly, when the wire experiences a short circuit, only the fuse connected with this wire blows out. Since only the circuit connected with the wire having experienced a short circuit is brought into an inoperative state, the number of inoperative circuits can be minimized.

Furthermore, if the fuses connected with the respective loads are formed by an integrated flat fuse including a plurality of small size and small capacity electrodes, an increase in the number of fuses to be mounted neither requires a large mounting space nor makes the junction box larger and heavier.

According to a preferred embodiment, the fuses connected in one-to-one relationship with the loads are formed by an integrated flat fuse comprising a plurality of conductive fusible elements arranged at specified intervals on the surface of an insulating plate, and that a plurality of flat fuses are accommodated in fuse receptacles formed on a junction box.

A flat fuse which the present applicant proposed in Japanese Unexamined Patent Applications Nos. 7-91698 and 7-91699 may be suitably used for the above flat fuse. This flat fuse is such that fusible elements made of metal wire or flat metal tape are adhered to the surface of an insulating plate at specified intervals.

The number of fuses increases because the fuses are mounted in one-to-one relationship with the loads. By using a flat fuse, a plurality of fuses can be integrated on one insulating plate. The multielectrode fuse necessitates no large fuse mounting space, and enables the fuses to be smaller and lighter.

Preferably, the loads connected in one-to-one relationship with the fuses have a small current carrying capacity of 2 A or smaller, and wherein the loads are connected with the fuses having a small current carrying capacity of 3 A via thin wires having a core cross section of 0.3 $mm^2$ to 0.05 $mm^2$, preferably 0.14 $mm^2$.

If the loads connected in one-to-one relationship with the fuses are signal devices having a current carrying capacity of 2 A, mostly of 1 A or smaller, thin wires having a core cross section of 0.3 $mm^2$ to 0.05 $mm^2$, preferably 0.14 $mm^2$ can be used as wires for the signal circuits. Then, since about 70% of all circuits are signal circuits, the total weight of the wiring harness can be remarkably reduced.

A preferred embodiment of the invention provides a circuit protecting device for an automotive wiring harness, wherein in circuits connected with loads mounted in an automotive vehicle, fuses are connected in one-to-one relationship with the loads and that a multitude of fuses connected with neighboring loads are accommodated as a single unit in a fuse receptacle of one of the electrical connection boxes or in one of the fuse boxes which are dispersedly disposed in the vehicle so as to shorten the length of wires connecting the corresponding fuses and loads.

In the above circuit protecting device, since the fuses are connected in one-to-one relationship with the corresponding loads, the current carrying capacity thereof can be made smaller. Accordingly, the wires connecting the fuses and loads are allowed to have a smaller core cross section, thereby making the wiring harness lighter. Further, upon blowout of one fuse due to a short circuit in one wire, a power supply to one load connected with the blown fuse is cut off. Thus, the circuits are individually protected and the loads connected with the wires having experienced no short circuit are not affected.

Further, the fuses connected in one-to-one relationship with the neighboring loads are combined and accommodated in the branch connection box or fuse box which is located near the neighboring loads. Accordingly, the length of the wires connecting the corresponding fuses and loads can be shortened. This prevents a total length of the wires from getting excessively long even if one fuse is provided for each load.

It is preferable to form the fuses by flat fuses having a plurality of electrodes in which conductive fusible elements are arranged at specified intervals on the surface of an insulating plate, and to accommodate the flat fuses in the fuse receptacles of the electrical connection boxes and/or in the fuse boxes which are dispersedly disposed in the vehicle.

Although the number of the fuses increases because they are provided in one-to-one relationship with the loads, if the flat fuse is as above, a multitude of fuses can be arranged on a single insulating plate. By using the flat fuses, no extra space is required to dispose the fuses and the fuses can be made smaller and lighter.

It is also preferable to use thin wires having a core cross section of 0.05 $mm^2$ to 0.3 $mm^2$ as the wires for connecting the fusible elements of the flat fuse and the loads, and to use wires having a core cross section of 0.5 $mm^2$ or larger as the wires each having one end connected with a power source and the other end branched to be connected with a plurality of fusible elements.

Further, since about 70% of the loads connected in one-to-one relationship with the fuses are signal devices having a current carrying capacity of 2 A or lower, mostly 1 A or lower, thin wires having a core cross section of 0.05 $mm^2$ to 0.3 $mm^2$, practically 0.14 $mm^2$ can be used as wires for signal circuits having a current carrying capacity of 1 A or lower. Thus, the total weight of the wiring harness can be remarkably reduced.

As is clear from the above description, in the above circuit protecting device for an automotive wiring harness, since the loads and fuses are connected in one-to-one relationship, the current carrying capacity of the fuses can be made smaller. As a result, thin wires having a core cross section of 0.05 $mm^2$ to 0.3 $mm^2$ can be used as wires connecting the corresponding fuses and loads. Particularly, when the load is a signal device having a current carrying capacity of 1 A or lower, the fuse is allowed to have a current carrying capacity of 2 A or lower, and the wire connecting these fuse and load is allowed to have a core cross section of as small as 0.14 $mm^2$. Further, since about 70% of all circuits are signal circuits, a total weight of the wires forming the wiring harnesses can be remarkably reduced. At the same time, the use of thin wires leads to a reduction in a production cost.

Further, a circuit protection can be individually realized for the loads. Accordingly, when the wire experiences a short circuit, only the fuse connected with this wire blows out. Since only the circuit connected with the wire having experienced a short circuit is brought into an inoperative state, the number of inoperative circuits can be minimized.

Further, the fuse boxes are dispersedly disposed in the automotive vehicle, in positions near many neighboring loads. These loads are connected with the fuses accommodated in the fuse boxes. Accordingly, despite the provision of the fuses in one-to-one relationship with the loads, the total length of the wires can be shortened.

Although the number of the fuses increases because they are connected in one-to-one relationship with a multitude of loads, no problem arises if small size and small capacity flat fuses having a multitude of integrated electrodes are used. In other words, a large number of fuses does not lead to a larger space, or a larger size or a heavier weight.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENT

Figure 1A:
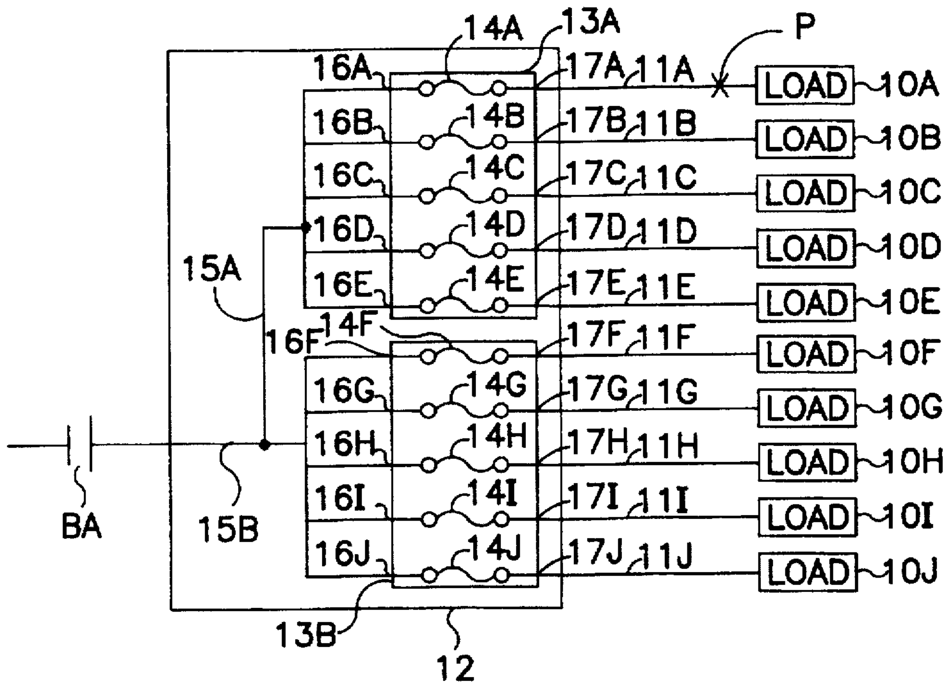
FIGS. 1(A) and 1(B) are circuit diagrams according to a first and a second embodiment of the invention.

As shown in FIG. 1(A), loads 10A to 10J are connected, via wires or cables 11A to 11J and connecting portions or connectors 17A–17J, with downstream ends of fuses 14A to 14J accommodated in fuse receptacles 13A, 13B formed on a junction box 12. In other words, unlike the prior art shown in FIG. 3 wherein a plurality of loads are connected with one fuse, one fuse is connected with one load via one wire.

Upstream ends of the fuses 14A to 14E connected with a battery BA are connected with one circuit 15A via connecting portions or connectors 16A–16E, whereas upstream ends of the fuses 14G to 14J are connected with one circuit 15B via connecting portions or connectors 16G–16J. The circuits 15A and 15B are joined and connected with the battery BA.

In this embodiment, the loads 10A to 10J connected with the fuses 14A to 14J in one-to-one relationship include signal devices have a current carrying capacity or nominal current value or nominal power value of 1 A or smaller. Accordingly, the current carrying capacity of the fuses 14A to 14J connected with these loads 10A to 10J via the wires 11A to 11J is set e.g. at 2 A. The wires 11A to 11J are thin wires having a core cross section of 0.14 $mm^2$ and having a current carrying capacity of 5 A. The wires are lightweight with a mass of 2.4 g/m, and an outer diameter of the final wire covered with insulation coating of 1.0 mm.

In the case of the use in the vehicle compartment, a current carrying capacity ratio of the fuse to the load is set at about 70% as described above. For example, if a load has a current carrying capacity of 5 A, a fuse having a current carrying capacity of about 7 A is used. In this case, a wire connecting a downstream end of the fuse and the load is a thin wire suitable for an actual current flow. For example, a wire having a core cross section of 0.3 $mm^2$ and a current carrying capacity of 8 A is used.

Figure 8:
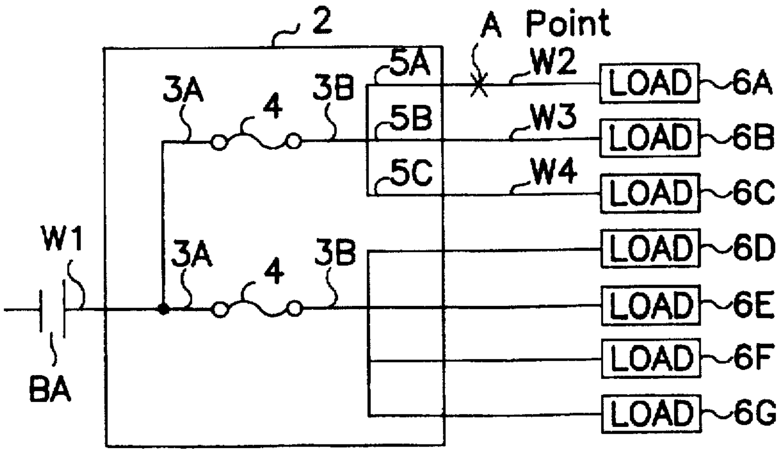
FIG. 8 PRIOR ART
FIG. 8 is a circuit diagram of a prior art power supply circuit.

The relationship between the current carrying capacity (A) and the wire dimensions is as shown in TABLE-2. Accordingly, the loads are connected in one-to-one relationship with the fuses having specified current carrying capacities corresponding to the current carrying capacities of the respective loads via the wires of specified dimensions having current carrying capacities corresponding to the current carrying capacities of the respective fuses. Thus, if the current carrying capacities of the loads differ, e.g. 3 A, 5 A and 2 A as in the prior art shown in FIG. 8, thin wires of different dimensions may be used for connection. Alternatively, in accordance with the maximum current carrying capacity of the load, i.e. 5 A, all wires may have a core cross section of 0.3 $mm^2$.

TABLE 2

| Core Cross Section ($mm^2$) | Current Carrying Capacity (A) | Mass (g/m) | Final Outer Diameter (mm) |
|---|---|---|---|
| 0.14 | 5 | 2.4 | 1.0 |
| 0.2 | 6 | 3.2 | 1.2 |
| 0.3 | 8 | 5 | 1.4 |
| 0.5 | 11 | 7 | 1.6 |

As described above, by connecting the loads having a small current carrying capacity and mainly including signal devices in one-to-one relationship with the fuses, thin wires can be used downstream from the fuses, thereby remarkably reducing the weight of the wires. In the case that a short circuit occurs in point P of the wire 11A between the load 10A and the fuse 14A, the fuse 14A blows out before the wire 11A experiences smoking, thereby protecting the load 10A. Further, since the loads 10B to 10E connected with the other wires 11B to 11E which have not experienced any short circuit are not influenced, power can be supplied to them.

Figure 1B:
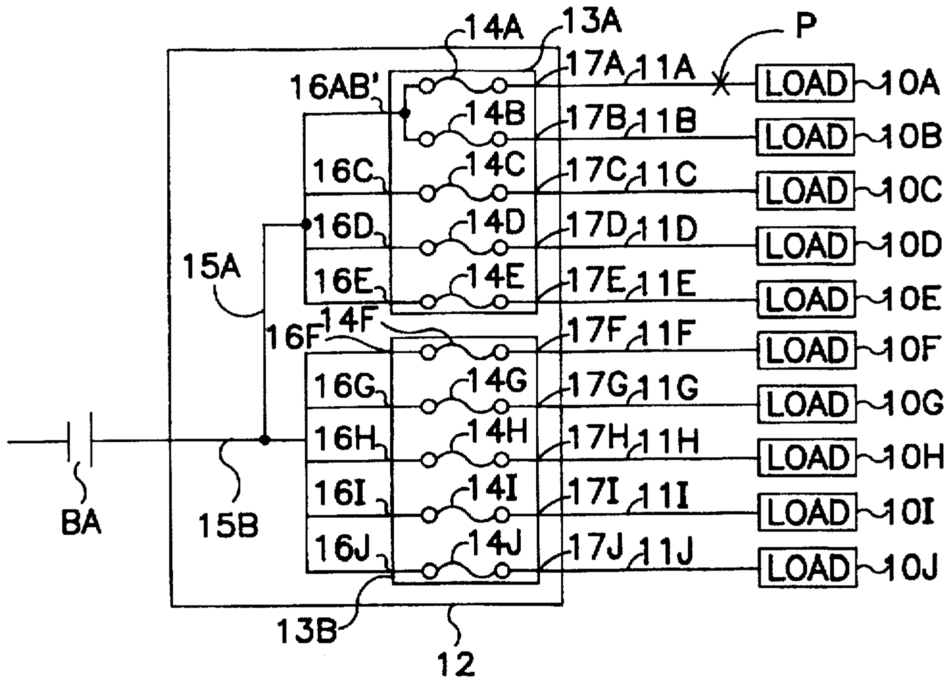

A further preferred embodiment of the invention is shown in FIG. 1(B). The embodiment shown in FIG. 1(B) differs from the embodiment shown in FIG. 1(A) in that the two fusible elements or fuses 14A and 14B are connected with the circuit 15A via one single connector or connecting portion 16AB' which may be a wire and/or solder connecting two wires and/or a metal plate or the like.

Figure 2A:
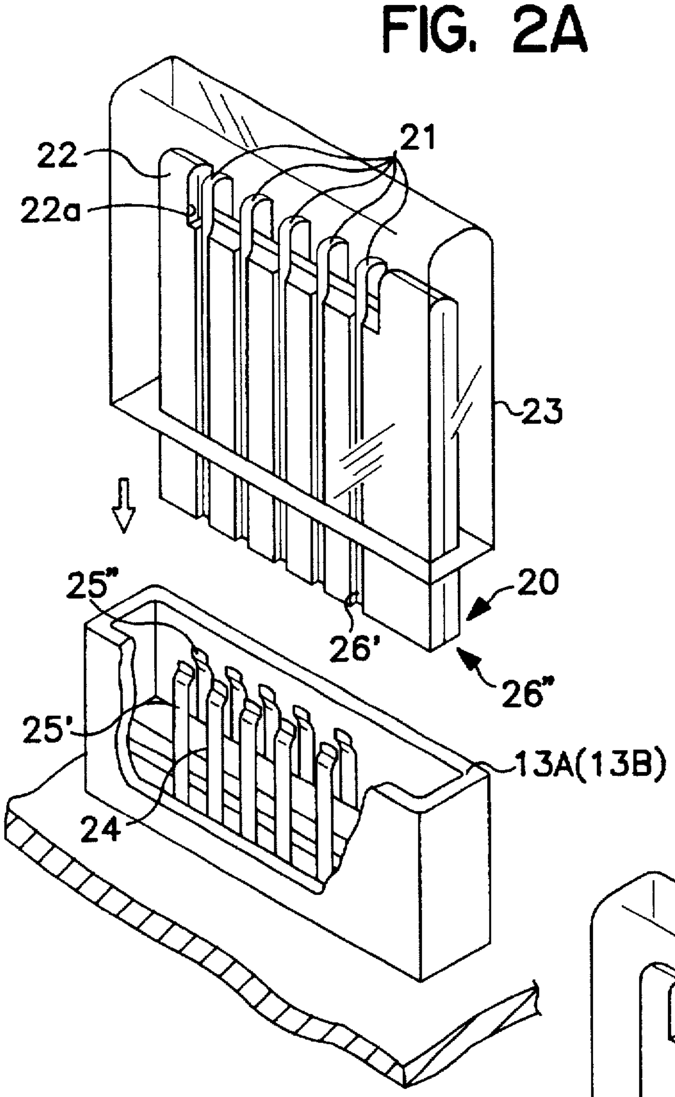
FIGS. 2(A) and 2(B) are perspective views of a flat fuse used in a circuit according to the embodiment of the invention shown in FIG. 1(A) before and after it is inserted into a fuse receptacle, respectively.
Figure 2B:
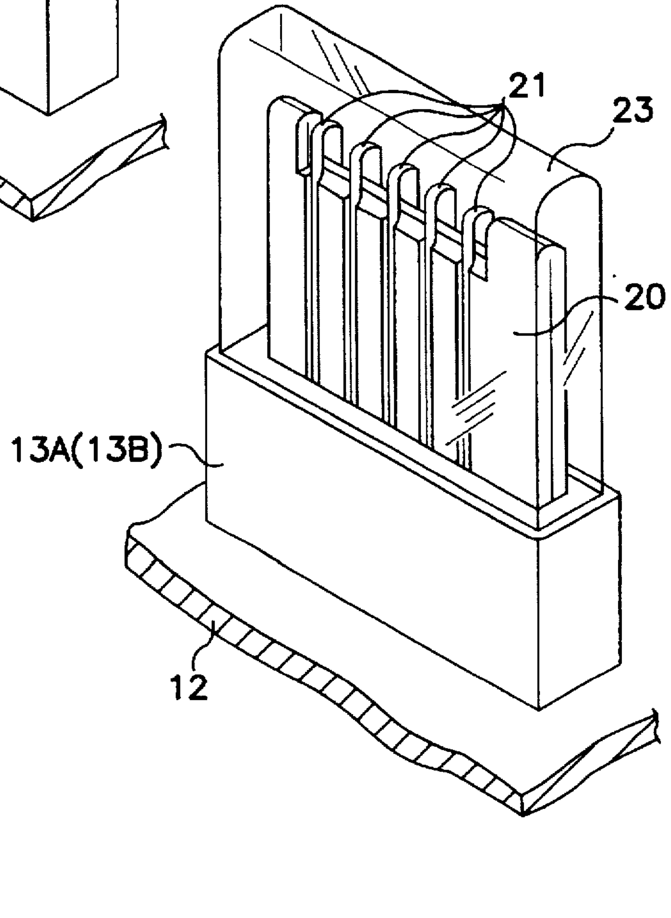

The fuses 14A to 14E, 14F to 14J of a small current carrying capacity to be connected in one-to-one relationship with the loads 10A to 10E, 10F to 10J are formed by flat fuses 20 having five electrodes as shown in FIGS. 2(A) and 2(B). The fuses 20 are to be accommodated in the fuse receptacles 13A, 13B formed on the junction box 12 and connected with circuits formed by busbars (not shown) accommodated in the junction box 12.

Each fuse 20 with five electrodes includes five fusible elements (fuse main body) 21 made of metal flat tape and an insulating plate 22 formed at its upper end with a window 22*a*. The five fusible elements 21 are arranged at specified intervals and bent such that they hold the insulating plate 22 from opposite sides and their bent portions are located in the window 22*a*. After being fitted with covers 23 or after being integrally casted in a molded body, being preferably transparent, the flat fuses 20 are inserted into the fuse receptacles 13A, 13B formed on the junction box 12. In the respective fuse receptacles 13A, 13B, the insulating plate 22 is placed on an insulating base plate 24, bringing five pairs of terminal electrodes 25', 25" projecting from the opposite surfaces of the base plate 24 into contact with the five fusible elements 21 via connecting portions or connectors 26', 26" being arranged on the opposite surfaces of the insulating plate 22 of the flat fuse 20, in particular in a parallel manner. The connectors 26, 26" interact with the electrodes 25', 25" on the base plate 24 thereby deflecting these and insuring a good and reliable electric connection. Two or more of the connectors 26' or 26" may be formed of a single metal piece or be electrically connected so as to form a single electrode. The electrodes 26', 26" may be deflectable, in particular in a direction normal to the insulating plate 22, in order to insure easy placement of the flat fuse 20 inside the fuse receptacle 13(A), 13(B). If a transparent body or cover 23 is used, it can be easily discriminated which of the fusible elements 21 has burned thus allowing a possibility of discriminating which load has drawn an increased current.

Although the flat fuse shown in FIGS. 2(A), 2(B) has five electrodes, there can be provided a flat fuse having a desired number of electrodes only by increasing the number of fusible elements arranged on the insulating plate. However some electrodes or connecting portions, in particular on the current input side or primary side, may be joined in one or more single electrodes. The use of the integrated flat fuse 20 including a plurality of small size and small capacity electrodes compensates for an increase in the number of fuses due to the one-to-one arrangement of loads and fuses, thereby preventing the protecting device from getting larger and heavier.

Figure 3:
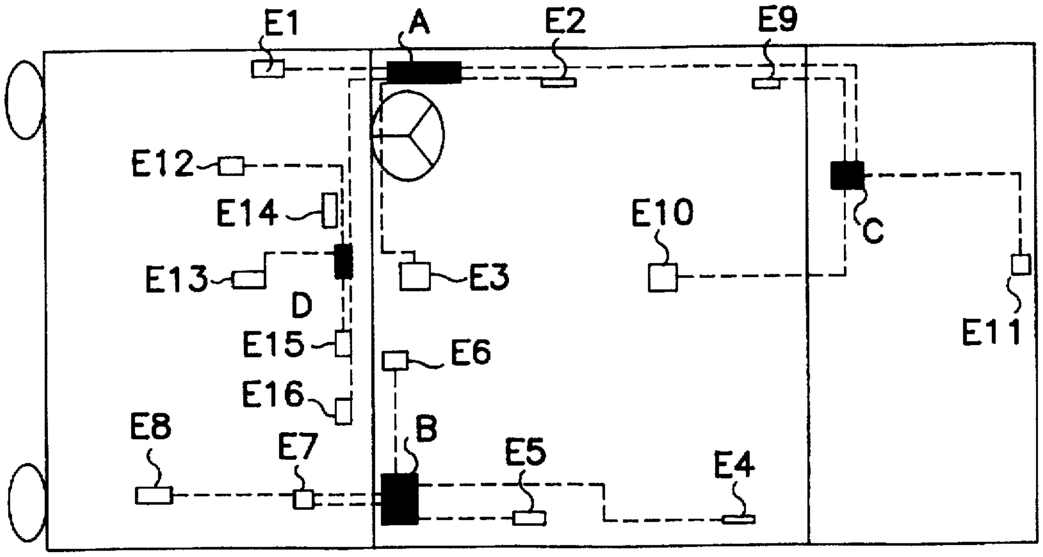
FIG. 3 is a diagram of a third embodiment of the invention, showing an arrangement of fuse boxes mounted in a vehicle.

As shown in FIG. 3, according to this embodiment, junction boxes A, B are disposed on the opposite sides of an instrument panel, i.e. of a front portion of a vehicle compartment, and fuse boxes C, D are disposed in an engine compartment and a trunk compartment, respectively. A flat fuse having a multitude of integrated electrodes is accommodated in each of the boxes A to D.

Figure 4:
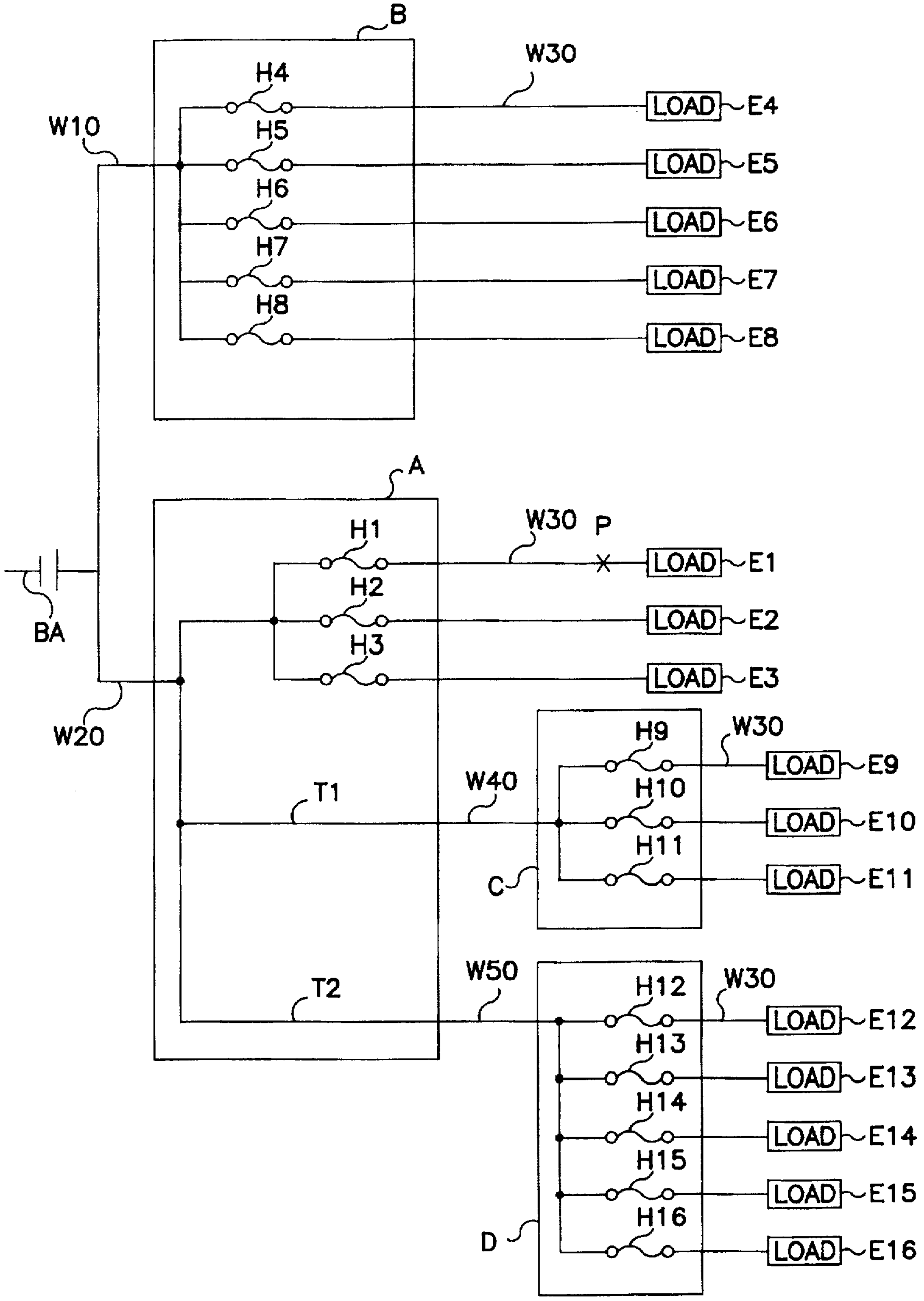
FIG. 4 is a circuit diagram of the third embodiment.
Figure 5A:
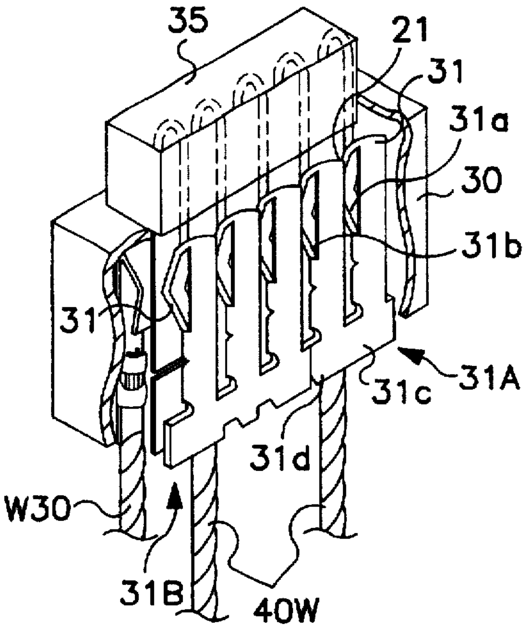
FIGS. 5(A) to 5(D) show a fuse box used in the third embodiment of the invention, FIG. 5(A) being a partly broken away perspective view, FIG. 5(B) a vertical section of FIG. 5(A), FIG. 5(C) a circuit diagram, and FIG. 5(D) a perspective view when the fuse box is closed by a lid.
Figure 5B:
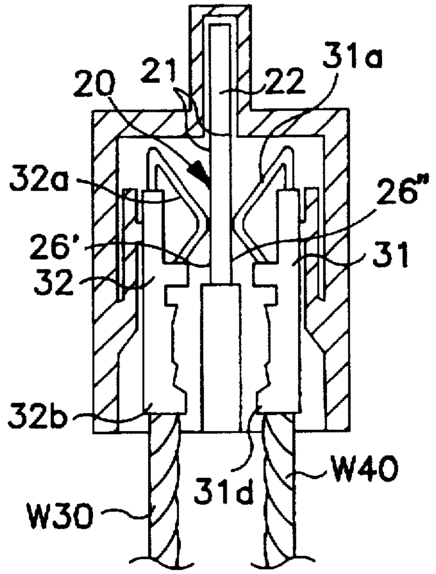
Figure 5C:
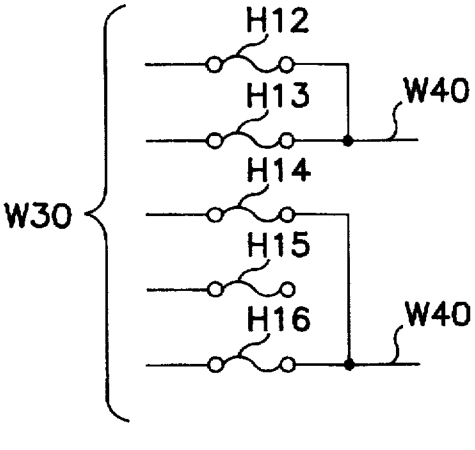
Figure 5D:
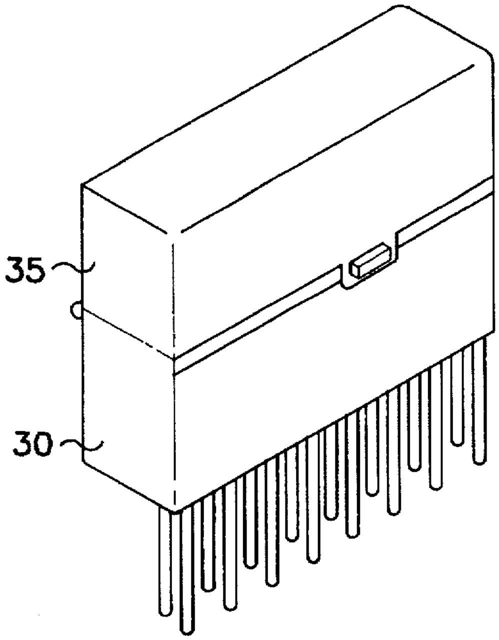

A circuit for connecting a power source or battery BA with the flat fuses accommodated in the boxes A to D is constructed as shown in FIG. 4. Specifically, the power source BA is connected with the junction boxes A and B via branch wires W20 and W10, respectively. In the junction box A, a power source side circuit is branched and connected with fuses H1 to H3 connected with loads E1 to E3 via thin wires W30, and through circuits or connections T1 and T2 connected with the fuse boxes C and D via wires W40, W50, respectively are provided. On the other hand, in the junction box B, the power source side circuit is branched and connected with fuses H4 to H8 connected with loads E4 to E8 via thin wires W30.

In the fuse box C connected with the through circuit T1 of the junction box A via the wire W40, the wire W40 is branched and connected with fuses H9 to H11 connected with loads E9 to 11 via thin wires W30, respectively. Likewise, in the fuse box D connected with the through circuit T2 of the junction box A via the wire W50, the wire W50 is branched and connected with fuses H12 to H16 connected with loads E12 to E16 via thin wires W30, respectively.

The loads E1 to E16 connected in one-to-one relationship with the fuses accommodated in the boxes A to D are disposed in the vicinity of the corresponding fuses. In other words, the fuses connected with the neighboring loads are combined and accommodated in a neighboring one of the junction boxes or fuses boxes which are dispersedly disposed in the automotive vehicle.

In this embodiment, the loads E1 to E16 connected in one-to-one relationship with the fuses H1 to H16 include signal devices having a current carrying capacity of 1 A and, accordingly, the current carrying capacity of the fuses H1 to H16 connected with the loads E1 to E16 via the wires W30 are set to about 2 A. Further, wires having a current carrying capacity of 5 A and a small core cross section of 0.14 $mm^2$ are used as wires W30. The wire having a core cross section of 0.14 $mm^2$ is lightweight with a mass of 2.4 g/m, and an outer diameter of the final wire covered with insulation coating of 1.0 mm.

As described above, by connecting the loads having a small current carrying capacity and mainly including signal devices in one-to-one relationship with the fuses, thin wires can be used downstream from the fuses, thereby remarkably reducing the weight of the wires. In the case that a short circuit occurs in point P of the wire W30 between the load E1 and the fuse H1, the fuse H1 blows out before the wire W30 experiences smoking, thereby protecting the load E1. Further, since the loads E2 to E16 connected with the other wires W30 which have not experienced any short circuit are not affected, power can be supplied to them.

The fuses H1 to H16 of a small current carrying capacity to be connected in one-to-one relationship with the loads E1 to E16 are formed by flat fuses 20 having a plurality of electrodes as shown in FIGS. 2(A) and 2(B).

The flat fuse to be accommodated in the junction box A has at least 3 electrodes; the flat fuse to be accommodated in the junction box B is the one having at least 5 electrodes as shown in FIGS. 2(A) and 2(B); the flat fuse to be accommodated in the fuse box C has at least 3 electrodes; and the flat fuse to be accommodated in the fuse box D has at least 5 electrodes.

The flat fuse to be accommodated in the junction box A or B is similarly constructed to the flat fuse described in reference to FIGS. 2(A) and 2(B).

The fuse box D is constructed as shown in FIGS. 5(A) to 5(D), and a flat fuse 20 is accommodated in a housing 30. Similar to the flat fuse shown in FIGS. 2(A) and 2(*b*), the flat fuse 20 is such that five fusible elements 21 are bent over the opposite surfaces of an upright insulating plate 22 and terminal fittings 31, 32 connected with the wires W40 and W30 are pressingly connected with the opposite sides of the fusible elements 21. The housing 30 is provided with a lid 35. The housing 30 is closed by the lid 35 after the flat fuse 20 is accommodated therein.

The terminal fitting 31 connected with the wires W40 at the power supply side includes two terminal fittings 31A, 31B. The terminal fitting 31A is formed with two contact portions 31*a*, 31*b* connectable with two fusible elements 21 at its upper portion, and a connection portion 31*c* at its lower portion. A wire mount portion 31*d* is formed at the bottom of one lateral side of the connection portion 31*c*. The terminal fitting 31A is connected with the wire W40 via the wire mount portion 31*d*. The terminal fitting 31B is similarly shaped to the terminal fitting 31A, and has three contact portions connectable with three fusible elements 21 at its upper portion.

Each of the terminal fittings 32 connected with the loads E12 to E16 via the wires W30 is formed with a contact portion 32*a* to be brought into pressing contact with one fusible element 21 at its upper portion, a wire mount portion 32*b* to be connected with one wire W30 at its lower end. The terminal fitting 32 is connected with the wire W30 via the wire mount portion 32*b*.

Since the fuse box C is similarly constructed to the fuse box D, no description is given thereto.

As described above, by bringing the terminal fittings 31, 32 connected with the respective wires into pressing contact with the opposite sides of the fusible elements 21 bent over the opposite surfaces of the insulating plate 22, each load is connected with one fuse (fusible element 21).

Figure 6A:
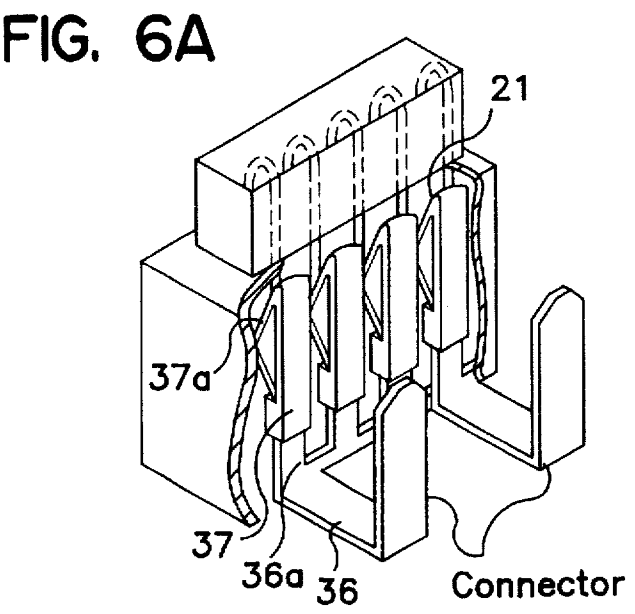
FIGS. 6(A) and 6(B) show a fourth embodiment of the fuse box, FIG. 6(A) being a partly broken away perspective view and FIG. 6(B) a perspective view of an essential portion.
Figure 6B:
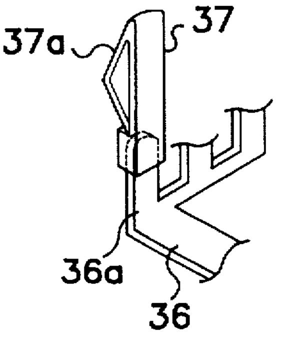

The construction of the fuse boxes C and D is not limited to the one shown in FIGS. 5(A) to 5(D). They may be constructed as shown in FIGS. 6(A) and 6(B). Specifically, at the power source side of the fuse box, there is disposed a busbar 36 connected with the power source via the wire W40 or W50 and a connector (not shown). The busbar 36 is formed with five tabs 36*a* projecting in parallel. Intermediate terminal fittings 37 are fitted on the tabs 36*a*, and contact portions 37*a* thereof are pressingly connected with the fusible elements 21. Since the load side of the fuse box has the same construction as a corresponding side of the fuse box shown in FIGS. 5(A) to 5(D), no description is given thereto.

Figure 7:
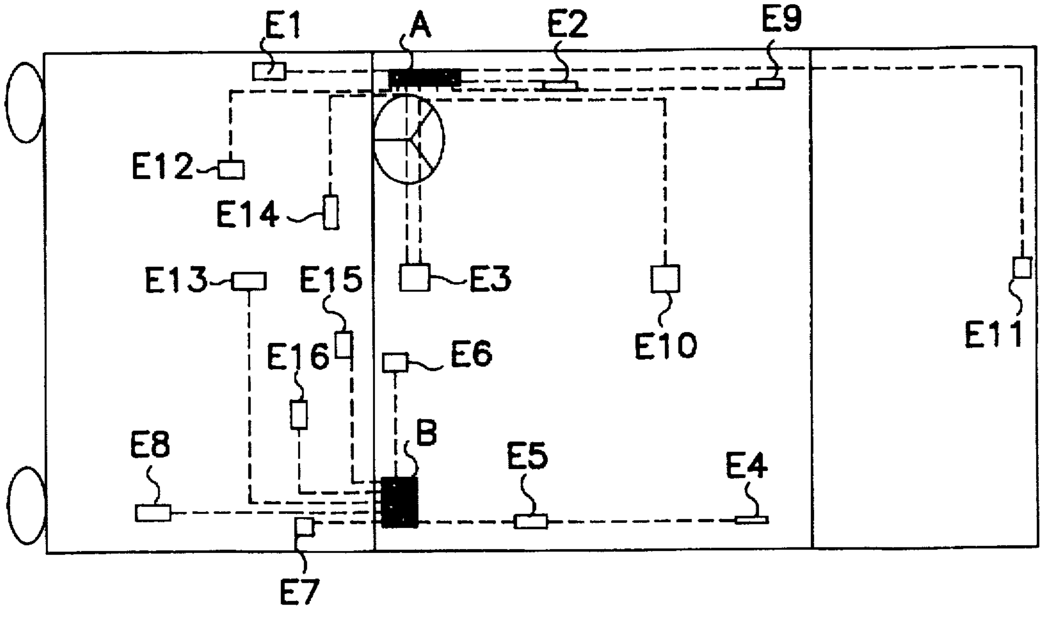
FIG. 7 is a diagram, similar to FIG. 3, showing an arrangement when no fuse box is used.

If the fuse boxes C, D are dispersedly disposed in positions close to a multitude of neighboring loads to be connected with the fuses, the length of the wires connecting the loads and the fuses can be shortened as compared to a case where the fuses are accommodated only in the junction boxes A and B and connected with the respective loads as shown in FIG. 7. Therefore, a total length of the wires forming wiring harnesses to be arranged in a vehicle can be shortened.

Further, as described above, since thin wires can be used to connect the fuses and the loads in one-to-one relationship, the total weight of wiring harnesses to be mounted in the vehicle can be remarkably reduced.

What is claimed is:

1. A circuit protecting device for an automotive wiring harness, comprising:

a primary side connecting portion (16A–16J; 16AB'; 26'), a plurality of secondary side connecting portions (17A–17J; 26") and a plurality of fusible elements ( 14A–14J; 21; H1–H3; H4–H8; H9–H11; H12–H16), respectively connectable with a plurality of neighboring loads (10A–10E; 10F–10J; E1–E3; E4–E8; E9–E11; E12–E16) and accommodated as a single unit in a fuse receptacle (24, 25; 30; A; B; C; D); and wherein said primary side connecting portion comprises a plurality of primary wires (15A, 15B; W10; W20; W40; W50), each having one end coupled to a power source (BA) and the other end branched to be connected with at least two of said fusible elements (14A–14J; H1–H16); and said plurality of secondary side connecting portions comprise a plurality of secondary wires (11A–11J; W30), each having a core cross section smaller than said primary wires, and connecting one of said plurality of fusible elements (14A–14J; H1–H16) one-to-one with one of said neighboring loads (10A–10J; E1–E16).

2. A circuit protecting device according to claim 1, wherein the primary side connecting portion (16A–16J; 16AB'; 26'), the secondary side connecting portions (17A–17J; 26', 26") and the fusible elements (14A–14J; 21) are arranged in on a body (23).

3. A circuit protecting device according to claim 1, wherein each said fusible element (14A–14J; 21) comprises at least one wire having a predetermined current carrying capacity.

4. A circuit protecting device according to claim 1, wherein the primary side connecting portion (16A–16J; 16AB'; 26'), the secondary side connecting portions (17A–17J; 26', 26") and the fusible elements (14A–14J; 21) are in a single socket (24).

5. A circuit protecting device according to claim 2, wherein at least fusible parts of the fusible elements (14A–14J; 21) are visible from the outside.

6. A circuit protecting device according to claim 1, wherein said plurality of fusible elements (14A–14E; 14F–14J; H1–H3; H4–H8; H9–H11; H12–H16), connectable with neighboring loads (10A–10E; 10F–10J; E1–E3; E4–E8; E9–E11; E12–E16) are accommodated as a single unit in a fuse receptacle (24, 25; 30; A; B; C; D), in an automotive vehicle.

7. A circuit protecting device according to claim 1, wherein said secondary wires have a core cross section of about 0.05 $mm^2$ to about 0.3 $mm^2$ and said primary side wires have a core cross section of about 0.5 $mm^2$ or larger.

8. A circuit protecting device for an automotive wiring harness coupled at a primary end by a plurality of primary wires (15A–15B; W10, W20, W40, W50) to a power supply (BA) and having a secondary end comprising a plurality of secondary wires (11A–11J; 26"; W30) respectively connectable to a plurality of loads (10A–10J; E1–E16), said device comprising;

a plurality of fusible elements (14A–14J; 21; H1–H16), each having a primary side connecting portion (16A–16J; 16AB'; 26') and a secondary side connecting portion (17A–17J; 26"), and each said fusible element (14A) having its secondary side connecting portion (17A) respectively connected to one (11A) of said plurality of secondary wires for coupling one-to-one to one respective load (10A), and each said fusible element (14A) having its primary side connecting portion (16A) connected in common with at least one other fusible element's primary side connecting portion (16B) to at least one of said primary wires (15A) for coupling to said power supply (BA), such that each of the respective primary wires (15A, 1SBF w10; W2Q; W40; W50) has one end coupled to said power source (BA) and the other end branched to at least two of said fusible elements (14A–14J; H1–H16), and wherein said secondary wires each have a core cross section smaller than said primary wires.

9. A circuit protecting device according to claim 8, wherein at least two of said fusible elements (14A–14J; 21) have the same primary side connecting portion (16AB').

10. A circuit protecting device according to claim 8, wherein at least two of said fusible elements (14A–14J; 21) are disposed in a respective receptacle (13A) in a single junction box (12).

11. A circuit protecting device according to claim 10, wherein said junction box (12) comprises means (23) for permitting the viewing of said fusible elements within said junction box.

12. A circuit protecting device according to claim 8, wherein at least two of said fusible elements (14A–14J; 21) comprise a flat fuse (20) including said elements arranged at specified intervals on the surface of an insulating plate (22).

13. A circuit protecting device according to claim 12, further comprising an insulating base plate (24) having electrodes (25', 25") thereon and wherein said insulating plate (22) has connectors (26', 26") thereon contacting said fusible elements and is mounted on said insulating base plate (24) with said electrodes (25', 25") contacting said connectors (26', 26").

14. A circuit protecting device according to claim 11, wherein one of said fusible elements (14A–14J; 21) has a current carrying capacity that is 10/7 that of the load to which it is connected.

15. A circuit protecting device according to claim 11, wherein said secondary wires (11A–11J; 26"; W30) have a current carrying capacity in the range from about 5 A to about 11 A.

16. A circuit protecting device according to claim 11, wherein said secondary wires (11A–11J; 26"; W30) have a core cross-section in the range from about 0.14 to about 0.5 $mm^2$, a mass in the range from about 2.4 to about 7 g/m, and an outer diameter in the range from about 1.0 to 1.6 mm.

17. A circuit protecting device according to claim 11, wherein said secondary wires (11A–11J; 26"; W30) have core cross-sections in the range from about 0.05 $mm^2$ to about 0.3 $mm^2$ and said primary wires have core cross-sections of at least about 0.5 $mm^2$.

18. A circuit protecting device according to claim 11, further comprising a junction box (12), a receptacle (13A) mounted in said junction box, and a base plate (24) mounted on said receptacle, and wherein said at least one primary side connecting portion (16A–16J; 16AB'; 26'), at least two secondary side connecting portions (17A–17J; 26', 26") and the respective two fusible elements (14A–14J; 21) connected therebetween are all mounted on said base plate (24).

19. A circuit protecting device according to claim 8, wherein said junction box (12) comprises means for mounting said box on an automotive vehicle.

20. A circuit protecting device according to claim 8, wherein said primary side wires (15A, 15B; W10; W20; W40; W50) each have one end connected with a power source (BA) and the other end branched with each branch being respectively connected to one of said primary side connecting portions (16A–16J; 16AB'; 26').

21. A circuit protecting device for a wiring harness, comprising a plurality of fusible elements (14A–14J; 21; H1–H16); at least one primary side connecting portion (16A–16J; 16AB'; 26') comprising a plurality of primary wires 15A, 15B; W10; W20; W40; W50) each having a first end coupled to a power source (BA) and a second end branched and connected with at least two of said fusible elements (14A–14J; H1–H16), at least two secondary side connecting portions (17A–17J; 26") each comprising a secondary wire (11A–11J; W30) connected one-to-one with a respective load (10A–10J; E1–E16) and having a smaller core cross-section than said primary wire (15A, 15B; W20; W40; W50), such that each said secondary wire (11A–11J; W30) is connected with one said primary wire (15A, 15B; W10; W20; W40; W50) via one said fusible element (14A–14J; 21).

22. A circuit protecting device according to claim 21, wherein a multitude of said fusible elements (14A–14E; 14F 14J; H1–H3; H4–H8; H9–H11; H12–H16) are each respectively connectable with neighboring loads (10A–10E; 10F–10J; E1–E3; E4–E8; E9–E11; E12–E16) and are accommodated as a single unit in a fuse receptacle (24, 25; 30; A; B; C; D) located in one of an electrical connection box (A; B) and a fuse box (C: D).

23. A circuit protecting device according to claim 21, comprising at least two of said electrical connection boxes (A; B) and fuse boxes (C; D) dispersedly disposed in an automotive vehicle.

* * * * *